(12) United States Patent
Pottiez et al.

(10) Patent No.: US 9,625,150 B2
(45) Date of Patent: Apr. 18, 2017

(54) GLOW PLUG

(71) Applicant: BorgWarner Ludwigsburg GmbH, Ludwigsburg (DE)

(72) Inventors: Christian Pottiez, Eppingen (DE); Michael Haußner, Benningen (DE); Bernd Stoller, Fellbach (DE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 136 days.

(21) Appl. No.: 14/519,887

(22) Filed: Oct. 21, 2014

(65) Prior Publication Data

US 2015/0114333 A1 Apr. 30, 2015

(30) Foreign Application Priority Data

Oct. 29, 2013 (DE) .................. 10 2013 111 922

(51) Int. Cl.
| | | |
|---|---|---|
| *F23Q 7/00* | (2006.01) | |
| *F02P 19/00* | (2006.01) | |
| *F02P 19/02* | (2006.01) | |
| *G01L 7/06* | (2006.01) | |
| *F23Q 7/22* | (2006.01) | |

(52) U.S. Cl.
CPC .............. *F23Q 7/001* (2013.01); *F02P 19/00* (2013.01); *F02P 19/028* (2013.01); *F23Q 7/22* (2013.01); *G01L 7/06* (2013.01); *G01L 7/061* (2013.01)

(58) Field of Classification Search
CPC ..... F02P 19/00; F02P 19/028; G01L 19/0627; G01L 7/06; G01L 7/061; G01L 7/063; F23Q 7/00; F23Q 7/001; F23Q 7/22; F23Q 2007/002; H05B 3/0042
USPC ............ 219/260, 267, 270; 123/145 R, 549; 73/114.18
See application file for complete search history.

(56) References Cited

U.S. PATENT DOCUMENTS

| | | | |
|---|---|---|---|
| 8,479,697 B2 | 7/2013 | Volland et al. | |
| 2001/0015402 A1* | 8/2001 | Murai ................... | G01L 23/222 248/554 |
| 2009/0242540 A1 | 10/2009 | Itoh et al. | |
| 2013/0263808 A1* | 10/2013 | Ratosa .................... | F23Q 7/001 123/145 A |

(Continued)

FOREIGN PATENT DOCUMENTS

| | | |
|---|---|---|
| DE | 10 2007 044 967 A1 | 4/2009 |
| DE | 10 2007 049 971 A1 | 4/2009 |

(Continued)

OTHER PUBLICATIONS

English Machine Translation of JP2006010306 provided by Espacenet.*

*Primary Examiner* — Grant Moubry
*Assistant Examiner* — Michael A Kessler
(74) *Attorney, Agent, or Firm* — Bose McKinney & Evans LLP

(57) ABSTRACT

Described is a glow plug with a glow pencil that comprises a forward end with a glow tip and a rearward end, a housing in which the rearward end of the glow pencil is arranged and in relation to which the glow pencil is movable in its longitudinal direction, and a bellows that is connected to the housing and the glow pencil. According to this disclosure, it is provided that a forward end of the bellows is attached to the housing and a rearward end of the bellows is attached to the glow pencil.

12 Claims, 2 Drawing Sheets

(56) References Cited

U.S. PATENT DOCUMENTS

2013/0319094 A1    12/2013   Nakamura et al.
2014/0216145 A1    8/2014   Hauβner et al.

FOREIGN PATENT DOCUMENTS

| DE | 10 2013 101 177 A1 | | 8/2014 | |
|----|--------------------|---|--------|---|
| GB | 2489520 A | | 10/2012 | |
| JP | 2006-010306 A | | 1/2006 | |
| JP | 2006010306 A | * | 1/2006 | ............... F23Q 7/00 |
| WO | WO 2012/115080 A1 | | 8/2012 | |

* cited by examiner

GLOW PLUG

RELATED APPLICATIONS

This application claims priority to DE 10 2013 111 922.0, filed Oct. 29, 2013, which is hereby incorporated herein by reference in its entirety.

BACKGROUND

The invention relates to an improvement to a glow plug of the type generally known from GB 2489520 A or DE 10 2007 044 967 A1.

Glow plugs comprising a glow pencil which is movable in a longitudinal direction in relation to its housing can be used to measure the combustion chamber pressure. In order to protect the sensors and the electronics against hot combustion gases and to prevent combustion gases from leaking through an annular gap between the glow pencil and the housing, the glow plugs known from GB 2489520 A and DE 10 2007 044 967 A1 comprise a bellows that is attached to the glow pencil with its forward combustion-chamber-side end and to the housing with its rearward end.

Deposits of residual fuel on the bellows may restrict the movability of the glow pencil in relation to the housing. In order to handle such coking problems, the bellows of the glow plug known from DE 10 2007 044 967 A1 is coated with catalytic materials which promote the combustion of residual fuel. GB 2489520 A also refers to the problem of coking and teaches that a sealing element should be mounted between the forward end of the bellows and the housing. Due to the sealing element, combustion gases enter the annular space between the bellows and the housing in small quantities only, with the result that the risk of coking is reduced accordingly.

SUMMARY

This disclosure teaches how coking of the bellows of a glow plug can be prevented in an even better manner.

In a glow plug according to this disclosure, the bellows is attached to the housing with its forward end and to the glow pencil with its rearward end, with the result that the surface of the bellows that faces the glow pencil is exposed to combustion chamber gases during operation. The bellows thus subdivides an annular space between the housing and the glow pencil into two annular spaces that are sealed against each other. The first annular space between the bellows and the glow pencil is open to the front, i.e., to the combustion chamber. The second annular space between the bellows and the housing is sealed against the first annular space, i.e., closed at its forward end.

In a glow plug according to this disclosure, the annular space that is accessible to combustion chamber gases is, therefore, disposed between the glow pencil and the bellows instead of between the bellows and the housing. Surprisingly, this reduces coking considerably.

Without wishing to be tied to any particular theory, the reduced susceptibility to coking of a glow plug according to this disclosure can presumably be explained by the fact that, in general, the temperature in the annular space between the glow pencil and the bellows is in excess of that in the annular space between the bellows and the housing. A higher temperature makes condensation of residual fuel difficult and promotes the combustion thereof.

Within the scope of this disclosure, it has in particular been detected that residual fuel deposits mostly at the rearward end of the bellows of a glow plug. In a glow plug according to this disclosure, the rearward end of the bellows is attached to the glow pencil instead of to the housing and has, therefore, a comparably higher temperature. This higher temperature counteracts coking.

The comparably higher temperature at the rearward end of the bellows of a glow plug according to this disclosure is associated with a comparably lower temperature at the forward end of the bellows. Since the forward end of the bellows is disposed in closer proximity to the combustion chamber and the hot glow tip, however, the temperature at that end is still high enough to prevent residual fuel from condensing there or to combust any deposits that may have developed, at least in most of the operating states of an engine.

An advantageous refinement of this disclosure provides that the forward end of the bellows is connected to the housing via a ring or a sleeve. Production can thereby be facilitated. The glow pencil, the bellows and the ring or sleeve can be pre-assembled and then the ring can be attached to the housing, for example, by welding. The ring or the sleeve can be welded to a forward front face of the housing. The front face is easily accessible and therefore facilitates welding in a highly simple manner.

A further advantageous refinement of this disclosure provides that a rearward end of the sleeve extends into the bellows. In this manner, assembly is facilitated. In one embodiment, the sleeve has a section that tapers to the rear to facilitate fitting the bellows. The sleeve can be welded to the bellows. A section of the sleeve that is welded to the bellows may have a greater wall thickness than a forward, possibly cylindrical section of the sleeve. The section having the greater wall thickness can, for example, be formed by the sleeve having a greater outside diameter there.

Within the scope of this disclosure, the terms "front" and "forward" always designate the end of a component that faces the combustion chamber during operation of the glow plug and/or the direction towards the glow tip. Accordingly, the terms "rear" and "rearward" designate the end of a component that faces away from the combustion chamber during operation of the glow plug.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
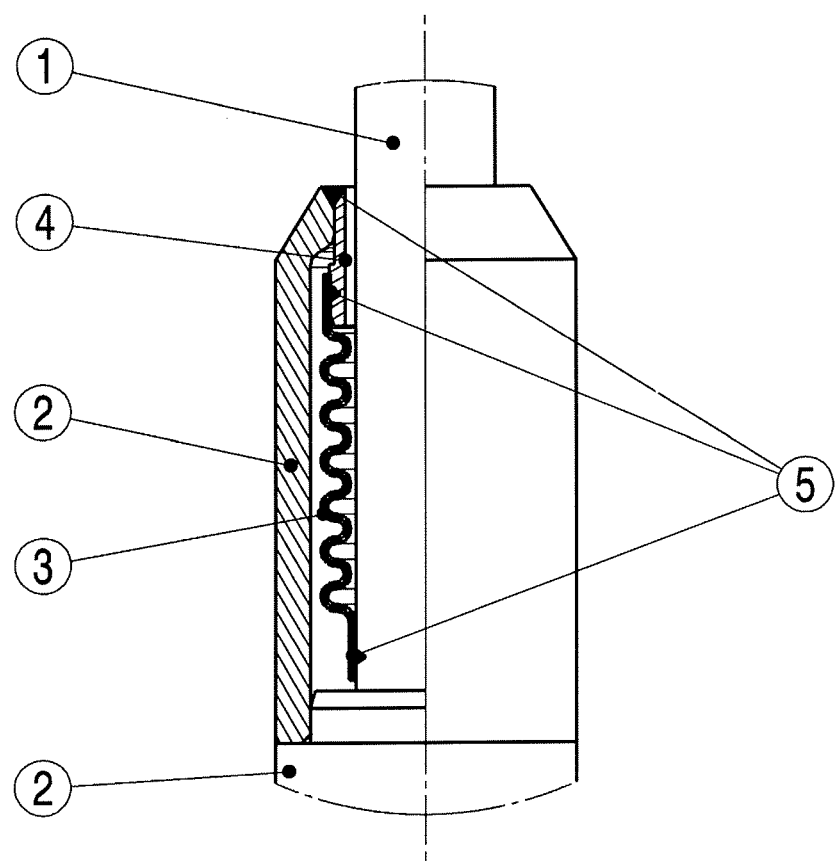
FIG. 1 is a schematic, partially sectional view of an illustrative embodiment of a glow plug according to this disclosure.
Figure 2:
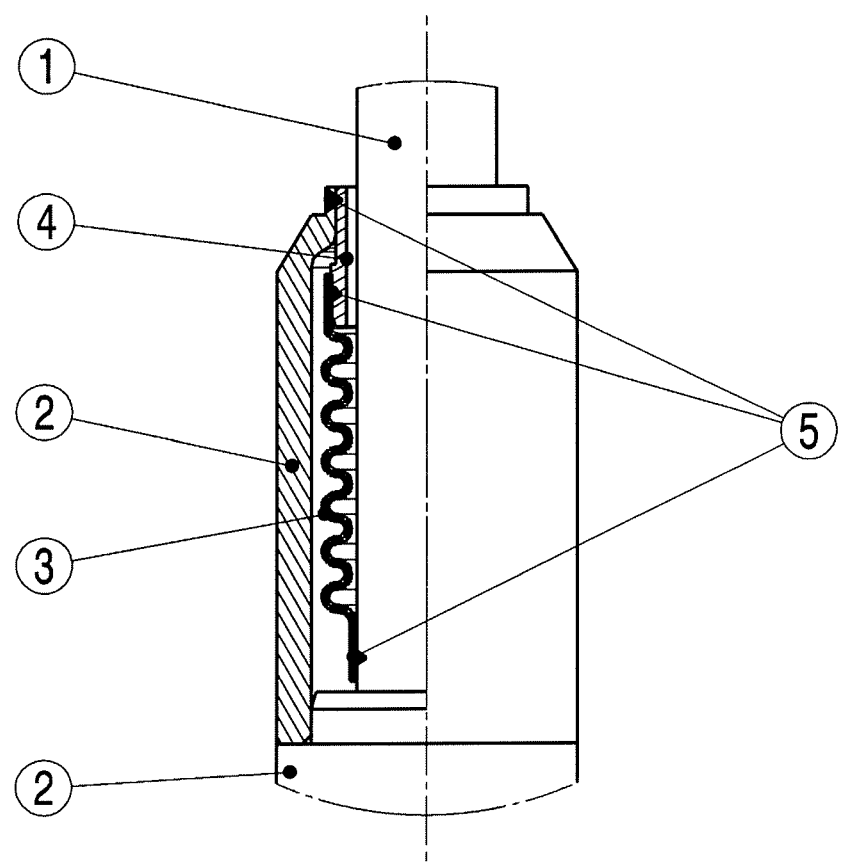
FIG. 2 is a schematic, partially sectional view of a further embodiment of a glow plug according to this disclosure.

The glow plugs that are schematically shown in FIGS. 1 and 2 have a glow pencil 1 that projects from a housing 2. The glow pencil 1 has a glow tip at its forward combustion-chamber-side end. The rearward end of the glow pencil 1 is arranged in the housing 2. The glow pencil 1 is movable in its longitudinal direction in relation to the housing 2 and against a restoring force. A sensor (that is not shown) of the glow plug detects a displacement of the glow pencil 1 in relation to the housing 2 and thus measures a combustion chamber pressure acting on the glow plug 1.

A section of the glow pencil 1 is surrounded by a bellows 3, for example a corrugated bellows or a corrugated tube. A forward combustion-chamber-side end of the bellows 3 is attached to the housing 1, for example through a sleeve 4 or a ring. A rearward end of the bellows 3 is attached to the glow pencil 1. Gases from the combustion chamber of an engine can, therefore, move into an annular space between the glow pencil 1 and the bellows 3, however, not into an annular space between the bellows 3 and the housing 2. During operation, heat flows from the glow tip at the forward end of the glow pencil 1 to its rearward end and from the glow pencil 1 via the rearward end of the bellows to the forward end of the bellows 3. Surfaces in the annular space between the bellows 3 and the glow pencil 1, therefore, have a relatively high temperature which makes depositing of residual fuel unlikely. For the most part, the temperature of the bellows is determined by the combustion temperature and depends on the engine load. The bellows is quickly heated up by the hot combustion chamber gases because it has a rather low thermal capacity. Since heat dissipation is also relatively low, the temperature is higher than would be the case with assembly in reverse order. The glow pencil helps to maintain a high temperature at the rearward end of the bellows.

A coating of a section of the glow pencil 1 that is surrounded by the bellows 3 and/or a coating of the surface of the bellows 3 that faces the glow pencil 1 can be used to additionally counteract any coking process. Such a coating of a material that catalytically promotes combustion of residual fuel can, for example, contain metals of the platinum group.

The bellows 3 can be brazed or welded to the glow pencil 1 at its rearward end. The forward end of the glow pencil 1 can be attached to the housing 2 by brazing or welding as well. Therein, the bellows 3 can be directly brazed or welded to the housing 2. It is also possible that the forward end of the bellows 3 is attached to a ring or a sleeve 4, for example by welding or brazing, and the ring or sleeve 4 is attached to the housing 2, for example by pressing in, brazing or welding. FIG. 1 shows weld seams 5 which connect the bellows 3 to the glow pencil 1 and the sleeve 4 or the sleeve 4 to the housing 2.

In the illustrated embodiment, the bellows 3 is completely arranged inside the housing 2, but it can also project from the housing 2 at its forward end. In the example shown in FIG. 1, the ring or the sleeve 4 ends flush with the housing 2, but it can also project from the housing 2, as it is shown in FIG. 2. In either case, the ring or the sleeve 4 can be welded to the forward front face of the housing 2.

The ring or the sleeve 4 can extend into the bellows 3 such as it is the case in the embodiments shown. In order to facilitate fitting the ring or the sleeve 4 into the bellows 3, the ring or sleeve 4 can comprise a section that is tapering to the rear.

In order to facilitate welding to the bellows 3, the sleeve 4 can comprise a cylindrical section that has a greater wall thickness than a cylindrical section that rests against the housing 2 in a housing opening. The section having the greater wall thickness can be welded more easily. The greater wall thickness can be achieved by a greater outside diameter.

The housing 2 can be assembled from a plurality of parts, for example a forward part which surrounds the bellows 3 and a rearward part.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A glow plug, comprising:
   a glow pencil having a forward end with a glow tip and a rearward end;
   a housing in which the rearward end of the glow pencil is arranged, the glow plug being movable in a longitudinal direction relative to the housing; and
   a bellows connected to the housing and the glow pencil;
   wherein a forward end of the bellows is attached to the housing and a rearward end of the bellows is attached to the glow pencil and wherein the bellows and the glow pencil define an annular space therebetween that extends from the forward end to the rearward end of the bellows, the annular space being open to a combustion chamber.

2. The glow plug according to claim 1, wherein the forward end of the bellows is attached to the housing by means of a ring or a sleeve.

3. The glow plug according to claim 2, wherein the ring or the sleeve extends into the bellows.

4. The glow plug according to claim 2, wherein the bellows is welded to the ring or the sleeve.

5. The glow plug according to claim 4, wherein the sleeve comprises a forward cylindrical section that rests against the housing in a housing opening and comprises a rearward cylindrical section that is welded to the bellows, wherein the rearward cylindrical section has a greater wall thickness than the forward cylindrical section.

6. The glow plug according to claim 2, wherein the housing comprises a weld seam on a front face, said weld seam connecting the housing to the ring or the sleeve.

7. The glow plug according to claim 2, wherein the ring or the sleeve has a section that tapers.

8. The glow plug according to claim 1, wherein the bellows is arranged completely in the housing.

9. The glow plug according to claim 1, wherein the rearward end of the bellows is welded to the glow pencil.

10. The glow plug according to claim 1, wherein a section of the glow pencil that is surrounded by the bellows or a surface of the bellows that faces the glow pencil comprises a coating that catalytically promotes combustion of residual fuel.

11. A glow plug, comprising:
    a glow pencil having a forward end with a glow tip and a rearward end;
    a housing in which the rearward end of the glow pencil is arranged, the glow plug being movable in a longitudinal direction relative to the housing; and
    a bellows connected to the housing and the glow pencil;
    wherein a forward end of the bellows is attached to the housing and a rearward end of the bellows is attached to the glow pencil, the bellows subdividing an annular space between the housing and the glow pencil into two annular spaces that are sealed against each other and that extend from the forward end to the rearward end of the bellows, a first one of the two annular spaces being located between the bellows and the glow pencil and being open to a combustion chamber.

12. The glow plug of claim 11, wherein a second one of the two annular spaces, which is located between the bellows and the housing, is sealed against the first one of the two annular spaces.

* * * * *